(12) United States Patent
Kamiya et al.

(10) Patent No.: US 9,950,660 B2
(45) Date of Patent: Apr. 24, 2018

(54) LIGHTING DEVICE

(71) Applicant: TOYODA GOSEI CO., LTD., Kiyosu-shi (JP)

(72) Inventors: Takayuki Kamiya, Kiyosu (JP); Tadaoki Ichikawa, Kiyosu (JP)

(73) Assignee: TOYODA GOSEI CO., LTD., Kiyosu-Shi, Aichi-Ken (JP)

( * ) Notice: Subject to any disclaimer, the term of this patent is extended or adjusted under 35 U.S.C. 154(b) by 0 days.

(21) Appl. No.: 15/422,356

(22) Filed: Feb. 1, 2017

(65) Prior Publication Data

US 2017/0274818 A1 Sep. 28, 2017

(30) Foreign Application Priority Data

Mar. 28, 2016 (JP) ................................. 2016-063565

(51) Int. Cl.
| | |
|---|---|
| *F21V 1/00* | (2006.01) |
| *B60Q 3/267* | (2017.01) |
| *B60Q 1/00* | (2006.01) |
| *E05B 17/10* | (2006.01) |
| *F21V 3/02* | (2006.01) |
| *F21V 15/01* | (2006.01) |
| *F21V 23/06* | (2006.01) |
| *E05B 85/12* | (2014.01) |

(52) U.S. Cl.
CPC ........... *B60Q 3/267* (2017.02); *B60Q 1/0088* (2013.01); *E05B 17/10* (2013.01); *E05B 85/12* (2013.01); *F21V 3/02* (2013.01); *F21V 15/01* (2013.01); *F21V 23/06* (2013.01)

(58) Field of Classification Search
CPC ....... B60Q 3/267; B60Q 1/0088; E05B 17/10; E05B 85/12; F21V 3/02; F21V 15/01; F21V 23/06
USPC ........................................................ 362/509
See application file for complete search history.

(56) References Cited

U.S. PATENT DOCUMENTS

| | | | |
|---|---|---|---|
| 6,239,693 B1 * | 5/2001 | Benard ............. | G07C 9/00944 296/146.7 |
| 7,751,664 B2 * | 7/2010 | Ieda ..................... | B60Q 1/2669 250/216 |

(Continued)

FOREIGN PATENT DOCUMENTS

| | | |
|---|---|---|
| JP | 3513211 B | 3/2004 |
| JP | 2007-185980 A | 7/2007 |

(Continued)

*Primary Examiner* — Bryon T Gyllstrom
(74) *Attorney, Agent, or Firm* — McGinn IP Law Group, PLLC

(57) ABSTRACT

A lighting device for use in vehicles includes a light generating part having a substrate and a light source disposed on the substrate; a base including a light emitting part having a light emitting surface for emitting light from the light source, and a reverse surface on a backside of the light emitting surface, and a connector housing part disposed on the reverse surface and housing a connector electrically connected to the light source; and a case assembled with the base and housing the light generating part and the connector housing part. The base including the light emitting part and the connector housing part is an integral molding and constituted by a light transmitting member containing a light diffusing material.

5 Claims, 3 Drawing Sheets

(56) References Cited

U.S. PATENT DOCUMENTS

| | | | | |
|---|---|---|---|---|
| 7,911,321 B2* | 3/2011 | Bingle | ............. | E05B 81/76 340/5.54 |
| 8,333,492 B2* | 12/2012 | Dingman | ............. | B60Q 1/2665 362/399 |
| 2002/0191386 A1* | 12/2002 | Cleaver | ............. | F21V 5/00 362/628 |
| 2003/0081423 A1* | 5/2003 | Shinji | ............. | B60Q 1/323 362/511 |
| 2007/0159854 A1* | 7/2007 | Kokubu | ............. | F21V 7/04 362/634 |
| 2009/0147528 A1* | 6/2009 | Wang | ............. | B60Q 1/2669 362/501 |
| 2011/0140479 A1* | 6/2011 | Okada | ............. | E05B 81/78 296/146.1 |
| 2013/0181607 A1* | 7/2013 | Yotsumoto | ............. | H05B 37/00 315/70 |
| 2014/0204599 A1* | 7/2014 | Miura | ............. | B60Q 1/2661 362/501 |
| 2015/0292682 A1* | 10/2015 | Yang | ............. | F21K 9/175 362/659 |

FOREIGN PATENT DOCUMENTS

| | | |
|---|---|---|
| JP | 4097927 B2 | 6/2008 |
| JP | 2013-182877 A | 9/2013 |

* cited by examiner

LIGHTING DEVICE

BACKGROUND OF THE INVENTION

1. Field of the Invention

The present invention relates to a lighting device for use in vehicles.

2. Description of Related Art

In recent years, vehicle interior lighting devices have been provided at a variety of positions in vehicles. One known example of such lighting devices is a device which illuminates an inside handle provided on a vehicle door, thereby improving a user's operability of the inside handle and conveying a sense of luxury through lighting performance. The inside handle is disposed in a recessed housing part provided on a door trim, and this lighting device is disposed on a reverse side of a surface of an upper wall of the housing part. The lighting device emits light toward an inside of the housing part through a slit which penetrates the upper wall. In this way, the lighting device illuminates the inside of the housing part and the inside handle disposed on the inside of the housing part.

One of such conventionally known type lighting devices for illuminating an inside handle as mentioned above is disclosed in Patent Document 1. The lighting device of Patent Document 1 comprises a light source, a light guide which converts light from the light source to linear or planar light, and a case for covering a top and a side of the light guide. In the lighting device of Patent Document 1, light from the light source is guided to a light emitting surface at a bottom of the light guide by the light guide, and light emitted from the light emitting surface illuminates the inside handle.

In such a lighting device, a connector housing in which a lighting device connector is to be attached is placed outside of the case in order to secure a large light emitting surface area, because the connector housing is generally impenetrable to light. By the way, as is often the case with lighting devices for illuminating vehicle interiors, the lighting devices need to be placed within limited space. Therefore, taking space for attaching and removing the lighting device connector in consideration, the size of the lighting devices sometimes needs to be decreased. In this case, the decrease in the size of the lighting devices may lead to a restriction in the size of the light emitting surfaces of the lighting devices and cause the lighting devices' insufficient illumination of a lighting target area. On the other hand, a product can be reduced in size by housing the connector housing in the case of the lighting device, for example, by placing the light source and the lighting device connector on a reverse surface side of the light emitting surface. In this case, however, the connector housing blocks the light from the light source and prevents a sufficient amount of light from reaching the light emitting surface. As a result, the lighting device may be incapable of sufficiently illuminating a lighting target area.

CITATION LIST

Patent Literature

Japanese Unexamined Patent Application Publication No. 2007-185,980

SUMMARY OF THE INVENTION

Technical Problem

The present invention has been made in view of the above circumstances. It is an object of the present invention to provide a lighting device capable of contributing to a reduction in size of the lighting device and sufficiently illuminating a lighting target area.

Solution to Problem

In order to solve the above problem, a lighting device of the present invention characteristically comprises a light generating part having a substrate and a light source disposed on the substrate; a base including a light emitting part having a light emitting surface for emitting light from the light source, and a reverse surface of the light emitting surface, and a connector housing part disposed on the reverse surface and housing a connector electrically connected to the light source; and a case assembled with the base and housing the light generating part and the connector housing part. The base including the light emitting part and the connector housing part is an integral molding, and comprises a light transmitting member containing a light diffusing material.

Advantageous Effects of Invention

The lighting device of the present invention having the above structure can contribute to a reduction in size of the lighting device and sufficiently illuminate a lighting target area.

DETAILED DESCRIPTION OF PREFERRED EMBODIMENTS

Figure 1:
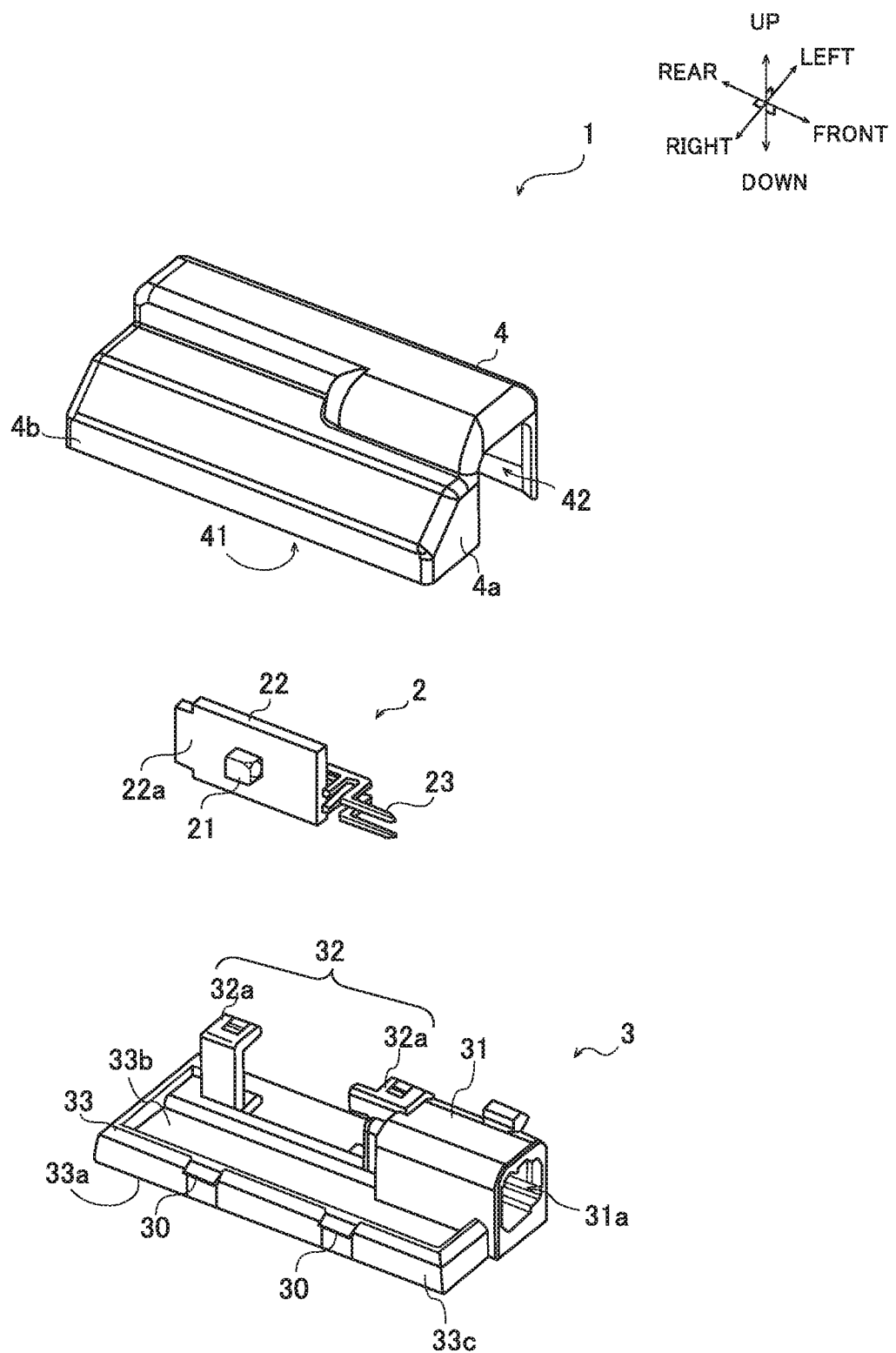
FIG. 1 is an exploded perspective view of a lighting device 1 of Example.

Hereinafter, a preferred example and an application example of a lighting device 1 of the present invention will be discussed with reference to FIGS. 1 to 4. Front, rear, right, left, up and down in FIGS. 1 to 4 are used when looking in a direction of forward travel of a vehicle. The direction of the lighting device 1 shown in FIGS. 1 and 2 is aligned to that of the application example shown in FIGS. 3 and 4. This direction is used for convenience of description only. Therefore, the direction of the lighting device of the present invention is not limited to this.

The drawings to be referred to in the present description are schematic views, and detail shapes, relative positions and sizes are not illustrated with strict accuracy.

Matters necessary to carry out the present invention other than those particularly mentioned in the present description can be understood as matters which a person skilled in the art will design based on a conventional art in a relevant field. The present invention can be carried out based on the disclosure in the present description and common technical knowledge in the relevant field.

EXAMPLE

The lighting device 1 of Example comprises a light generating part 2, a base 3, and a case 4.

The light generating part 2 has a light source 21 and a substrate 22 having a circuit, not shown. The light source 21 emits light upon electricity supply from an outside power supply, not shown. Although the light source 21 of Example is a surface mount LED, the kind and shape of the light source 21 is not particularly limited.

The substrate 22 has a thin plate shape. The light source 21 is disposed on one surface of the substrate 22 and the circuit is disposed on the other surface. Here in the present description, the one surface of the substrate 22 on which the light source 21 is disposed is called a light-source-disposed surface 22a. A lead terminal 23 electrically connected to the circuit is disposed on the substrate 22. A power supply harness, not shown, has one end connected to the outside power supply and the other end provided with a lighting device connector, and the lead terminal 23 can be electrically connected to the lighting device connector.

The base 3 includes a light emitting part 33, a fixing part 32, and a connector housing part 31. The base 3 including the light emitting part 33, the fixing part 32 and the connector housing part 31 is an integral molding formed by injection molding. The base 3 is formed of a material in which a light diffusing material is mixed in a light transmitting resin material, and the base 3 of Example is formed by injection molding a material in which a light diffusing material is dispersed in a polycarbonate resin material. The light transmitting resin material is not particularly limited and can be, for example, polymethyl methacrylate, polyethylene terephthalate and acryl resin materials, in addition to the abovementioned polycarbonate resin material. Examples of the light diffusing material include organic particles such as cross-linked acrylic beads, cross-linked polymethacryl styrene (a copolymer of methyl methacrylate and styrene; MS) beads, and inorganic particles such as silica, barium sulfate and titanium oxide particles, either singly or in combination of two or more kinds.

As shown in FIG. 1, the light emitting part 33 has a rectangular plate shape and has a light emitting surface 33a and a reverse surface 33b, which are opposite sides of one plate, and a side surface 33c located between the light emitting surface 33a and the reverse surface 33b. The side surface 33c has engagement claws 30 to be engaged with engagement holes, not shown, provided in the case 4 to be mentioned later.

The light emitting surface 33a is a surface facing an outside of the case 4 and emits light which has reached the light emitting part 33 from the light source 21 in the case 4 toward the outside of the case 4. The reverse surface 33b is a surface facing an inside of the case 4, and the fixing part 32 and the connector housing part 31 are integrally formed on the reverse surface 33b.

The fixing part 32 fixes the light generating part 2. The fixing part 32 has two holding parts 32a standing on the reverse surface 33b of the light emitting part 33 and each having a square U-shaped cross section. The two holding parts 32a are placed at a distance from each other. The two holding parts 32a hold the substrate 22 in a manner to grasp respective ends of the substrate 22 in the U-shaped structure, and cover partially the light-source-disposed surface 22a so as to expose the light source 21.

The connector housing part 31 is shaped of a tube with a through hole 31a and stands on the reverse surface 33b of the light emitting part 33. The lead terminal 23 of the light generating part 2 is placed in the through hole 31a of the connector housing part 31. The through hole 31a of the connector housing part 31 is formed so as to house the lighting device connector of the power supply harness, and the lead terminal 23 and the lighting device connector are electrically connected to each other in the through hole 31a.

The connector housing part 31 and the fixing part 32 are arranged side by side. Specifically, as shown in FIG. 1, the connector housing part 31 and the fixing part 32 are adjacent to each other on a left end side of the reverse surface 33b of the light emitting part 33. Part of the connector housing part 31 of Example protrudes from the fixing part 32 toward a right end side. In other words, the right end side of the connector housing part 31 protrudes from the fixing part 32 in a right direction on the reverse surface 33b of the light emitting part 33.

As mentioned above, the base 3 comprises a light transmitting member containing a light diffusing material. Therefore, all of the light emitting part 33, the fixing part 32 and the connector housing part 31, which are constituent elements of the base 3, comprises the light transmitting member containing the light diffusing material.

As shown in FIG. 1, the case 4 has a dome shape having a case opening 41 on a bottom thereof, and covers the light generating part 2, and the fixing part 32 and the connector housing part 31 provided on the base 3. As shown in FIG. 1, a front side wall 4a of the case 4 has a side opening 42 so as to expose the through hole 31a of the connector housing part 31. An inner surface of a right side wall 4b of the case 4 has engagement holes, not shown, to be engaged with the engagement claws 30 of the base 3.

The case 4 is formed of a material in which a light reflecting material is mixed in an opaque resin material (i.e. a light non-transmissive resin material). The case 4 of Example is formed by injection molding a material in which a light reflecting material is mixed in a polypropylene resin material. The opaque resin material is not particularly limited and can be, for example, acrylonitrile butadiene styrene (ABS) copolymer and other general-purpose resin materials in addition to the abovementioned polypropylene. Examples of the light reflecting material include titanium oxide, silicon oxide, aluminum oxide, potassium titanate, zinc oxide and boron nitride.

The lighting device 1 of Example is formed by assembling the light generating part 2, the base 3 and the case 4 in the following manner. First, the light generating part 2 is fixed to the fixing part 32 of the base 3. Specifically, the substrate 22 is inserted in the holding parts 32a of the fixing part 32 in a manner that the light-source-disposed surface 22a is perpendicular to the reverse surface 33b of the light emitting part 33. At this time, as shown in FIG. 1, the substrate 22 is fixed to the fixing part 32 in a manner that the light-source-disposed surface 22a of the substrate 22 faces a right end side of the lighting device 1, that is, the light source 21 faces the right end side of the lighting device 1. Since the fixing part 32 stands on a left end side of the reverse surface 33b of the light emitting part 33, the substrate 22 is disposed on the left end side of the reverse surface 33b.

As shown in FIG. 1, the connector housing part 31 is disposed beside the fixing part 32 on the left end side of the reverse surface 33b. Part of the connector housing part 31 protrudes from the fixing part 32 toward the right end side of the reverse surface 33b. Therefore, the part of the connector housing part 31 protrudes toward the right end side of the reverse surface 33b from the light-source-disposed surface 22a of the substrate 22 fixed at the fixing part 32.

Second, the case 4 is assembled with the base 3 on which the light generating part 2 has been fixed, in a manner to cover the light generating part 2 and the connector housing part 31. Specifically, the base 3 and the case 4 are assembled together by adjusting the position of the light emitting part 33 of the base 3 to that of the case opening 41 of the case 4 and the position of a front end part of the connector housing part 31 to that of the side opening 42 of the case 4. Then, the engagement claws 30 formed on the light emitting part 33 of the base 3 are fitted into and engaged with the engagement holes formed in the inner surface of the right side wall 4b of the case 4, thereby completing assembly of the lighting device 1.

Operation and Effect

The lighting device 1 of Example operates upon receiving electricity from the outside power supply through the power supply harness electrically connected to the outside power supply. Upon electric connection between the lighting device connector of the power supply harness and the lead terminal 23 disposed on the substrate 22 of the light generating part 2, the power supply harness supplies electricity from the outside power supply to the light generating part 2. At this time, the lighting device connector of the power supply harness is housed in the through hole 31a of the connector housing part 31.

When electricity is supplied to the light generating part 2, the light source 21 emits light. The light emitted from the light source 21 is incident on surfaces of the base 3 facing the inside of the case 4. Specifically, the light emitted from the light source 21 is directly or indirectly incident on the reverse surface 33b of the light emitting part 33, a surface of the connector housing part 31, and surfaces of the fixing part 32.

Herein, the light directly incident on the surfaces of the base 3 facing the inside of the case 4 (hereinafter also simply referred to as "direct light") is light which is emitted from the light source 21 and incident on the surfaces without being reflected by an inner surface of the case 4 or the like or passing through component parts (e.g., the connector housing part 31) other than the light emitting part 33 of the base 3. On the other hand, the light indirectly incident on the surfaces of the base 3 facing the inside of the case 4 (hereinafter also simply referred to as "indirect light") is light other than the direct light which is emitted from the light source 21. That is to say, the indirect light is, for example, light which is emitted from the light source 21 and reflected by the inner surface of the case 4 or the like, diffused by the light diffusing material contained in the base 3 (e.g., the light diffusing material contained in the connector housing part 31), or having passed through component parts other than the light transmitting part 33 of the base 3 (e.g., the connector housing part 31).

The direct or indirect light incident on the surfaces of the base 3 facing the inside of the case 4 reaches the light emitting surface 33a while diffused by the light diffusing material contained in the base 3. The light which has reached the light emitting surface 33a is emitted toward the outside of the case 4. Thus the lighting device 1 of Example can illuminate a lighting target area.

The base 3 of Example comprises the light transmitting member containing the light diffusing material, and the case 4 comprises the opaque member (i.e. the light non-transmissive member) containing the light reflecting material. Therefore, light from the light source 21 does not pass through the case 4 but can be reflected by the inner surface of the case 4 and incident on the surfaces of the base 3. The light incident on the surfaces of the base 3 can reach the light emitting surface 33a while diffused by the light diffusing material, and then be emitted from the light emitting surface 33a toward a lighting target area. Since the light emitted from the light source 21 can thus reach the light emitting surface 33a without loss, the lighting device 1 of Example can illuminate the lighting target area more brightly.

By the way, since the connector housing part 31 is placed in the case 4 in the lighting device 1 of Example, the lighting device connector is placed in the case 4. The lighting device connector is generally formed of an opaque material such as polyethylene terephthalate. Therefore, the lighting device connector placed in the connector housing part 31 may block direct or indirect light emitted from the light source 21. If there is an obstacle to light transmission in an optical path from the light source 21 to the light emitting surface 33a as in this case, an area which light from the light source 21 is difficult to reach may be formed on part of the reverse surface 33b of the light emitting part 33. Then, a sufficient amount of light cannot reach the light emitting surface 33a on a backside of this area which the light from the light source 21 is difficult to reach. As a result, the light emitting surface 33a may have a light shielded area, which is difficult to sufficiently illuminate the lighting target area.

Figure 2A:
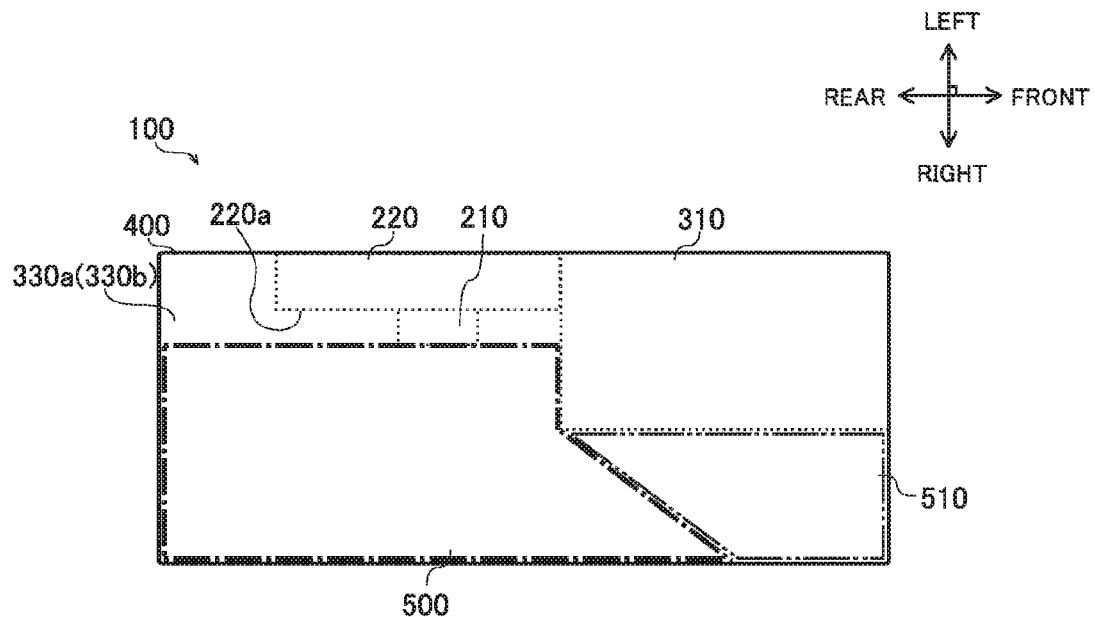
FIG. 2A is an explanatory view of a conventional lighting device 100.
Figure 2B:
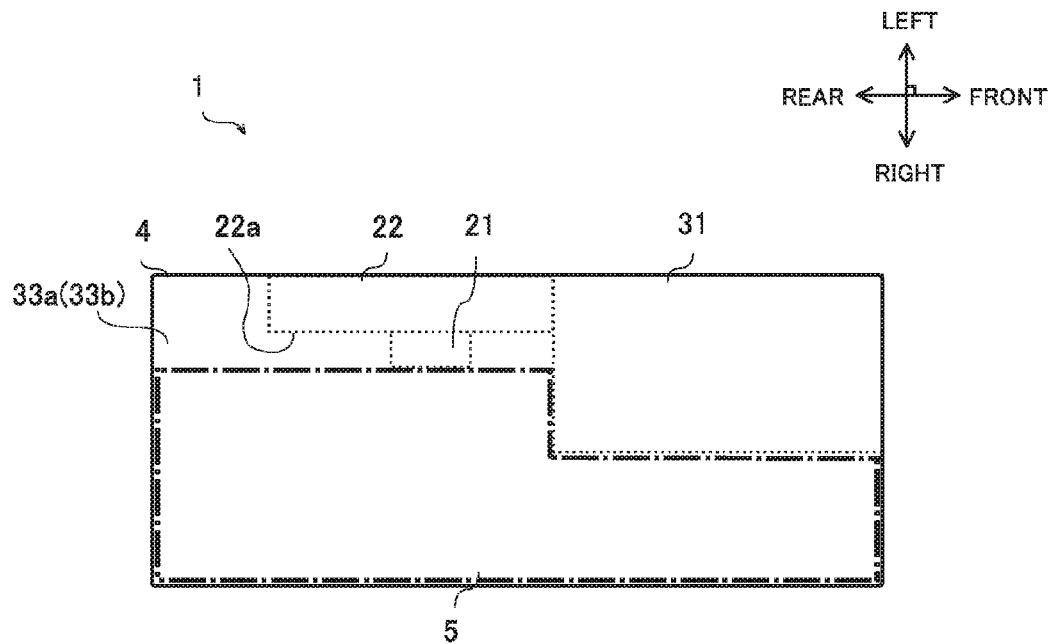
FIG. 2B is an explanatory view of the lighting device 1 of Example.

Now, discussion will be made with reference to FIGS. 2A and 2B. FIG. 2A is an explanatory view of a conventional lighting device 100 as seen from a light emitting surface 330a. FIG. 2B is an explanatory view of the lighting device 1 of Example as seen from the light emitting surface 33a. One-dot chain line in FIG. 2A indicates a luminous surface 500 to be mentioned later, and two-dot chain line in FIG. 2A indicates a light shielded area 510. One-dot chain line in FIG. 2B indicates a luminous surface 5 to be mentioned later.

In the conventional lighting device 100, as shown in FIG. 2A, the aforementioned light shielded area 510 is formed. When the connector housing part 310 where the lighting device connector is placed is located in a case 400, the connector housing part 310 becomes an obstacle to light transmission in an optical path. Therefore, as shown in FIG. 2A, the connector housing part 310 casts a shadow on a reverse surface 330b adjacent to a right side of the connector housing part 310, and the light shielded area 510 is formed on a light emitting surface 330a on a backside of this shadow. Therefore, in the conventional lighting device 100, the luminous surface 500, which is a lighting range where a light target area is sufficiently lighted, is an area at least excluding the light shielded area 510.

On the other hand, in the lighting device 1 of Example, as shown in FIG. 2B, the base 3 including the connector housing part 31 comprises the light transmitting member containing the light diffusing material. Therefore, light travelling toward the lighting device connector is incident on the connector housing part 31 comprising the light transmitting member and diffused by the light diffusing material contained in the connector housing part 31 before reaching the lighting device connector. Thus, the light travelling toward the lighting device connector can be diffused by the connector housing part 31 and then reach the light emitting surface 33a. Specifically, when light from the light source 21 is incident on the surface of the connector housing part 31, owing to the light diffusing material, the light can reach the light emitting surface 33a on a backside of the connector housing part 31. In addition to this, the light can also pass through the connector housing part 31 while diffused and be incident on the reverse surface 33b adjacent to the right side of the connector housing part 31, and reach the light emitting surface 33a on a backside of that reverse surface 33b. Therefore, since light can be diffused and go around to the shadow of the connector housing part 31, such a light shielded area as that 510 of the conventional lighting device 100 is not formed in the lighting device 1 of Example. That is to say, the luminous surface 5, which is a lighting area in the lighting device 1 of Example, is larger in area than the luminous surface 500 of the conventional lighting device 100.

Since the lighting device 1 of Example can secure a larger area of the luminous surface 5 than the conventional lighting device 100, the lighting device 1 of Example can illuminate a larger lighting target area. Besides, since the connector housing part 31 does not block light from the light source 21, a greater amount of light can reach the light emitting surface 33a in the lighting device 1 of Example. Accordingly, the lighting device 1 of Example can illuminate the lighting target area sufficiently brightly.

In the base 3 of the lighting device 1 of Example, the light-source-disposed surface 22a of the substrate 22 is disposed perpendicular to the reverse surface 33b of the light emitting part 33 in a manner that the light source 21 faces the right end side of the lighting device 1. Part of the connector housing part 31 protrudes from the light-source-disposed surface 22a of the substrate 22 toward the right end side of the reverse surface 33b. When the lighting device 1 has this structure, as shown in FIG. 2B, part of the connector housing part 31 is located within an optical path of direct light from the light source 21.

In the conventional lighting device 100, when part of the connector housing part 310 is located within an optical path of direct light from the light source 210, the connector housing part 310 may block the light from the light source 210. That is to say, the connector housing part 310 may cast a shadow as mentioned above, and the light shielded area 510 where a sufficient amount of light is difficult to reach may be formed on the light emitting surface 330a.

On the other hand, in the lighting device 1 of Example, as shown in FIG. 2B, light can go around to the shadow of the connector housing part 31 as mentioned above, and therefore such a light shielded area as that 510 of the conventional lighting device 100 is not formed. Therefore, the luminous surface 5 of Example can be larger in area than the luminous surface 500 of the conventional lighting device 100 as mentioned above.

Desirably, part of the connector housing part 31 is located within a light distribution angle in an optical path of direct light from the light source 21. The "light distribution angle" mentioned here is width of an angle between half maximum light intensity points (full width at half maximum) in a light intensity angular distribution around an optical axis of the light source 21. With this structure, the connector housing part 31 can be placed in vicinity of the light source 21, and this contributes to a reduction in size of the lighting device 1. Besides, in the lighting device 1 of Example, light can go around to the shadow of the connector housing part 31 as mentioned above, so such a light shielded area as that 510 of the conventional lighting device 100 is not formed. Therefore, even when reduced in size, the lighting device 1 can secure a sufficiently large area of the luminous surface 5.

In the lighting device 1 of Example, as shown in FIG. 2B, part of the connector housing part 31 is located between the light-source-disposed surface 22a of the substrate 22 and the reverse surface 33b of the light emitting part 33. In this case, direct or indirect light from the light source 21 is incident on the connector housing part 31. The light incident on the connector housing part 31 is diffused by the light diffusing material contained in the connector housing part 31 and reaches the light emitting surface 33a. That is to say, the light from the light source 21 can reach the light emitting part 33 with less loss. In addition, since the light incident on the connector housing part 31 can be diffused and then reach the light emitting surface 33a as mentioned above, the light can go around to the shadow of the connector housing part 31 and hence such a light shielded area as that 510 of the conventional lighting device 100 is not formed on the light emitting surface 33a. Therefore, since the area of the luminous surface 5 can be made large, the lighting device 1 of Example can illuminate a larger lighting target area.

The lighting device 1 of Example also has the following advantages. The substrate 22 of the light generating part 2 of Example is placed in a manner that the light-source-disposed surface 22a does not face the reverse surface 33b of the light emitting part 33, that is, in a manner that an optical axis of the light source 21 does not intersect the reverse surface 33b. This reduces the amount of direct light from the light source 21 which is incident on the reverse surface 33b and reaches the light emitting surface 33a when compared to the amount when the optical axis of the light source 21 intersects the reverse surface 33b. On the other hand, since the base 3 of Example comprises the light transmitting member containing the light diffusing material, light having entered the base 3 can be diffused by the light diffusing material and a greater amount of indirect light can reach the light emitting surface 33a. Since the greater amount of indirect light can reach the light emitting surface 33a, the lighting device 1 of Example can sufficiently illuminate a lighting target area. At the same time, since the amount of direct light reaching the light emitting surface 33a can be reduced, the lighting device of Example can reduce uneven brightness.

Application Example

Figure 3:
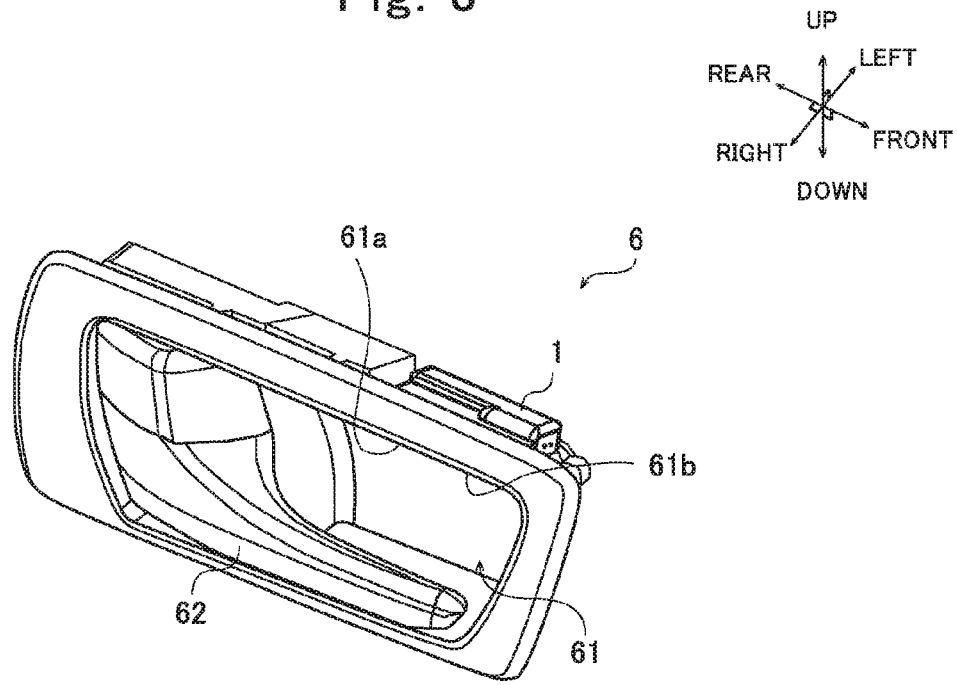
FIG. 3 is a perspective explanatory view of an application example in which the lighting device 1 of Example is used as a lighting device for an inside handle 6.
Figure 4:
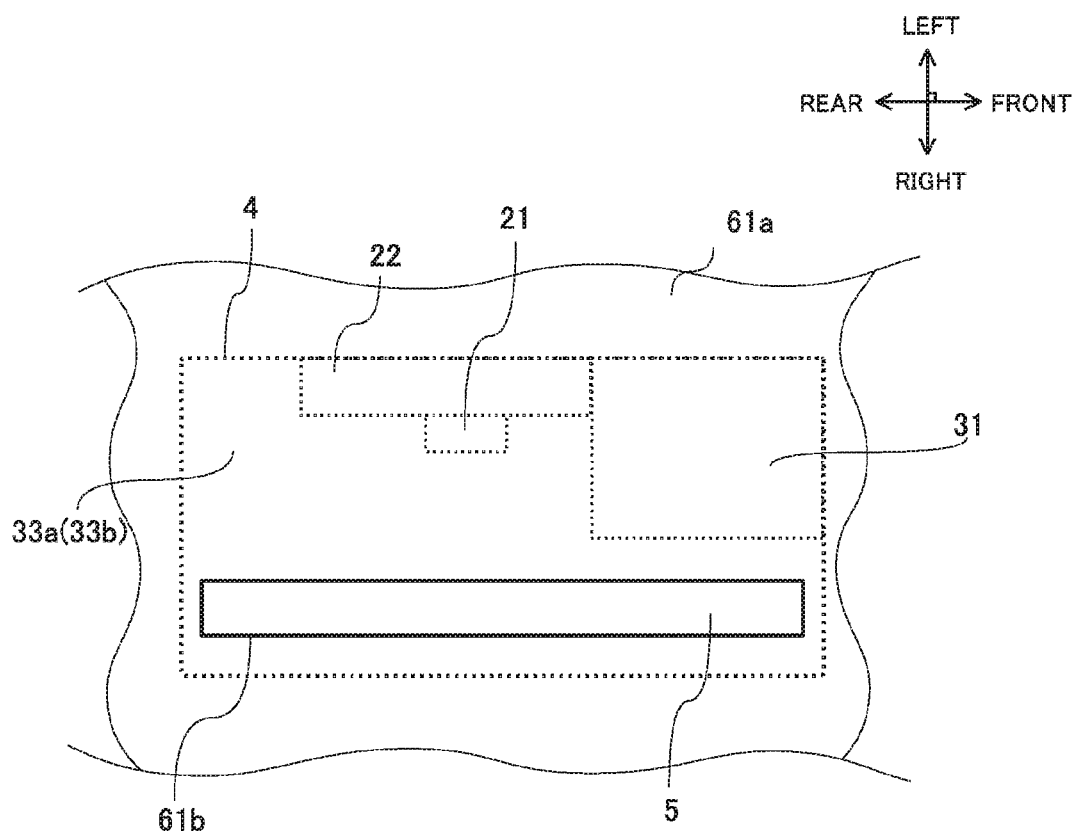
FIG. 4 is an explanatory view of the application example in which the lighting device 1 of Example is used as the lighting device for the inside handle 6.

Hereinafter, an application example in which the aforementioned lighting device 1 of Example is used in a vehicle interior will be discussed with reference to FIGS. 3 and 4. FIG. 3 is a perspective view of an inside handle 6 with the lighting device 1 of Example. FIG. 4 is a view of a slit part 61b of an upper surface 61a seen from an inside of a handle housing part 61 in FIG. 3, and a dotted line indicates the lighting device 1 placed on a backside surface of the upper surface 61a. In the application example, the lighting device 1 of Example is used as a lighting device for illuminating the inside handle 6.

The inside handle 6 shown in FIG. 3 is a conventionally used operation part of a vehicle door and is attached to a vehicle door trim, not shown. The inside handle 6 has a handle part 62 and the handle housing part 61 for housing the handle part 62.

The handle housing part 61 is a recessed part opening to the vehicle interior. The upper surface 61a located in an upper portion of the handle housing part 61 has the slit part 61b having a through hole shape and extending in a vehicle longitudinal direction. The lighting device 1 is disposed on the backside surface of the upper surface 61a of the handle housing part 61 and located outside the handle housing part 61. The light emitting surface 33a of the lighting device 1 and the backside surface of the upper surface 61a are contacted with each other, and part of the light emitting surface 33a faces an inside of the handle housing part 61 through the slit part 61b. In the application example, as shown in FIG. 4, the light emitting surface 33a which faces the inside of the handle housing part 61b through the slit part 61b is defined as a luminous surface 5. As shown in FIG. 4, part of the connector housing part 31 is located between the reverse surface 33b located on the backside surface of the luminous surface 5 and the light source 21.

When electricity is supplied to the lighting device 1 from a vehicle battery, the light source 21 emits light. Even though the connector housing part 31 is located in the case 4, a sufficient amount of light from the light source 21 can reach the luminous surface 5 as mentioned in the above description of Example. The light having reached the luminous surface 5 is emitted through the slit part 61b and illuminates the handle housing part 61 and the handle part 62. Therefore, since the sufficient amount of light from the light source 21 can reach the luminous surface 5, the luminous surface 5 in the application example can illuminate the handle housing part 61 and the handle part 62 sufficiently brightly through the slit part 61b.

In addition, as shown in FIG. 3, the backside of the upper surface 61a of the handle housing part 61 on which the lighting device 1 is placed is located between the door trim (i.e., a vehicle interior member) and a vehicle door (i.e., a vehicle body) and space between these components is generally limited. Therefore, it is desired that a lighting device to be placed in such a position is reduced in size and at the same time capable of emitting a sufficient amount of light. The lighting device 1 of Example can be reduced in size because the lighting device connector is housed in the case 4, and enable a sufficient amount of light from the light source 21 to reach the luminous surface 5 as mentioned above. Therefore, the lighting device 1 of Example is useful as a lighting device to be used in such a limited space as in the application example.

The preferred example and application example of the present invention have been described hereinbefore. However, the present invention is not limited to the above example and application example. For example, in the case 4 of Example, a light guide can be placed in space. This allows light from the light source 21 to be guided to the luminous surface 5 of the light emitting surface 33a more efficiently. In this case, more desirably the light guide contains a light diffusing material. When the light guide contains a light diffusing material, the light having entered the light guide from the light source 21 is diffused by the light diffusing material and then reaches the luminous surface 5. This reduces uneven brightness on the luminous surface 5.

Light diffusion treatment of forming uneven shape can be applied to the light emitting surface 33a and the surface of the connector housing part 31 of Example. The treatment allows the light from the light source 21 in the case 4 to be more diffused and a greater amount of light to reach the luminous surface 5 of the light emitting surface 33a.

The luminous surface 5 of Example is only part of the light emitting surface 33a. Instead, the whole light emitting surface 33a can be the luminous surface 5.

The case 4 of Example is formed by molding a material prepared by mixing the light reflecting material in the opaque material (i.e. the light non-transmissive material). However, the case 4 can have a structure formed by mixing no light reflecting material in the opaque material and applying a light reflecting coating to the inner surface of the case 4 comprising the opaque material.

In the connector housing part 31 of Example, an inner wall of the through hole 31a in which the lighting device connector is placed can be coated with an opaque material containing a light reflecting material. That is to say, the connector housing part 31 can have a structure in which light emitted from the light source 21 and incident on the connector housing part 31 does not reach the lighting device connector housed in the connector housing part 31. In this case, the light incident on the connector housing part 31 can reach the luminous surface 5 more efficiently without being lost due to absorption by the lighting device connector. Therefore, the amount of light emitted from the light source 21 and reaching the luminous surface 5 can be further increased.

The light emitting surface 33a in the application example is contacted with the backside surface of the upper surface 61a of the handle housing part 61, which acts as a mounting base, in a manner to embrace the entire slit part 61b. Since the light emitting surface 33a is disposed in contact with the mounting base, light emitted from the slit part 61b (corresponding to the luminous surface 5) can reach a lighting target area with less loss. However, the lighting device 1 can be placed in a manner that the light emitting surface 33a is located at a distance from the mounting base without contact. In this case, desirably the luminous surface 5 is larger than the slit part 61b and provided in a manner to embrace the entire slit part 61b. The size (area) of the luminous surface 5 is at least 1.0 time as large as that of the slit part 61b, and desirably at least 1.0 time and no more than 3.0 times as large as that of the slit part 61b, and more desirably at least 1.0 time and no more than 1.5 times as large as that of the slit part 61b.

When the luminous surface 5 has the abovementioned size, a sufficient amount of light from the light source 21 can reach a lighting target area through the slit part 61b of the mounting base.

The lighting device 1 of the present invention can be expressed as follows.

[1] The lighting device, comprising
a light generating part having a substrate and a light source disposed on the substrate;
a base including a light emitting part having a light emitting surface for emitting light from the light source, and a reverse surface on a backside of the light emitting surface, and a connector housing part disposed on the reverse surface and housing a connector electrically connected to the light source; and
a case assembled with the base and housing the light generating part and the connector housing part,
the base including the light emitting part and the connector housing part being an integral molding and comprising a light transmitting member containing a light diffusing material.

[2] The lighting device recited in [1], wherein at least part of the connector housing part is located in an optical path of light emitted from the light source.

[3] The lighting device recited in [1] or [2], wherein the substrate has a light-source-disposed surface on which the light source is disposed,
at least part of the connector housing part is located between the light-source-disposed surface and the reverse surface of the light emitting part in the case.

[4] The lighting device recited in any one of [1] to [3], wherein at least part of the connector housing part is located within a light distribution angle of light from the light source.

[5] The lighting device recited in any one of [1] to [4], wherein the light emitting surface has a luminous surface for emitting light to reach a lighting target area of the lighting device, at least part of the connector housing part is located between a backside surface (the reverse surface) of the luminous surface and the light source in the case.

What is claimed is:

1. A lighting device, comprising
a light generating part having a substrate and a light source disposed on the substrate;
a base including a light emitting part having a light emitting surface for emitting light from the light source, and a reverse surface on a backside of the light emitting surface, and a connector housing part disposed on the reverse surface and housing a connector electrically connected to the light source; and
a case assembled with the base and housing the light generating part and the connector housing part,
the base including the light emitting part and the connector housing part being an integral molding and comprising a light transmitting member containing a light diffusing material.

2. The lighting device according to claim 1, wherein at least part of the connector housing part is located in an optical path of light emitted from the light source.

3. The lighting device according to claim 1, wherein the substrate has a light-source-disposed surface on which the light source is disposed, and
at least part of the connector housing part is located between the light-source-disposed surface and the reverse surface of the light emitting part in the case.

4. The lighting device according to claim 1, wherein at least part of the connector housing part is located within a light distribution angle of light from the light source.

5. The lighting device according to claim 1, wherein the light emitting surface has a luminous surface for emitting light to reach a lighting target area of the lighting device,
at least part of the connector housing part is located between a backside surface of the luminous surface and the light source in the case.

* * * * *